United States Patent
Kubota

(10) Patent No.: US 8,836,984 B2
(45) Date of Patent: Sep. 16, 2014

(54) IMAGE PROCESSING APPARATUS, METHOD AND STORAGE MEDIUM FOR INCREASING THE SPEED OF PRINTING DATA STORED IN AN EXTERNAL STORAGE MEDIUM BY REDUCING THE NUMBER OF ACCESSES TO THE MEDIUM

(71) Applicant: Canon Kabushiki Kaisha, Tokyo (JP)

(72) Inventor: Tomohide Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/770,866

(22) Filed: Feb. 19, 2013

(65) Prior Publication Data

US 2013/0222830 A1    Aug. 29, 2013

(30) Foreign Application Priority Data

Feb. 28, 2012   (JP) ................................ 2012-042383

(51) Int. Cl.
G06F 3/12    (2006.01)
G06K 15/02   (2006.01)
G06K 15/00   (2006.01)

(52) U.S. Cl.
CPC .......... *G06K 15/181* (2013.01); *G06K 15/1822* (2013.01); *G06K 15/1852* (2013.01); *G06K 15/1815* (2013.01); *G06K 15/405* (2013.01)
USPC .......................... 358/1.15; 358/1.13; 358/1.1

(58) Field of Classification Search
None
See application file for complete search history.

(56) References Cited

U.S. PATENT DOCUMENTS

| 8,441,678 B2 * | 5/2013 | Kim et al. ..................... 358/1.15 |
| 2007/0143277 A1 * | 6/2007 | Van De Laar et al. ............ 707/5 |
| 2008/0266604 A1 * | 10/2008 | Kuroki et al. ................ 358/1.16 |

FOREIGN PATENT DOCUMENTS

JP    2008-183886 A    8/2008

* cited by examiner

*Primary Examiner* — Paul F Payer
(74) *Attorney, Agent, or Firm* — Fitzpatrick, Cella, Harper & Scinto

(57) ABSTRACT

The image processing apparatus of one aspect of the present invention generates configuration information that includes information indicating the sizes of files included in print data stored in an external storage medium and the locations thereof in the print data. When obtaining each file in the print data, the image processing apparatus obtains an obtainment target file and another file to be used for printing of the same page together with the target file, within the extent of the storage capacity of a storage unit of the image processing apparatus, from the external medium in a single access to it in accordance with the configuration information, and temporarily save them in the storage unit. The image processing apparatus performs analysis for printing with respect to the saved files in order.

16 Claims, 6 Drawing Sheets

| FILE NAME | LOCATION | SIZE |
|---|---|---|
| FILE 1 | A | A-B |
| FILE 2 | B | B-C |
| FILE 3 | C | ... |
| ... | ... | ... |
| FILE N | N | ... |

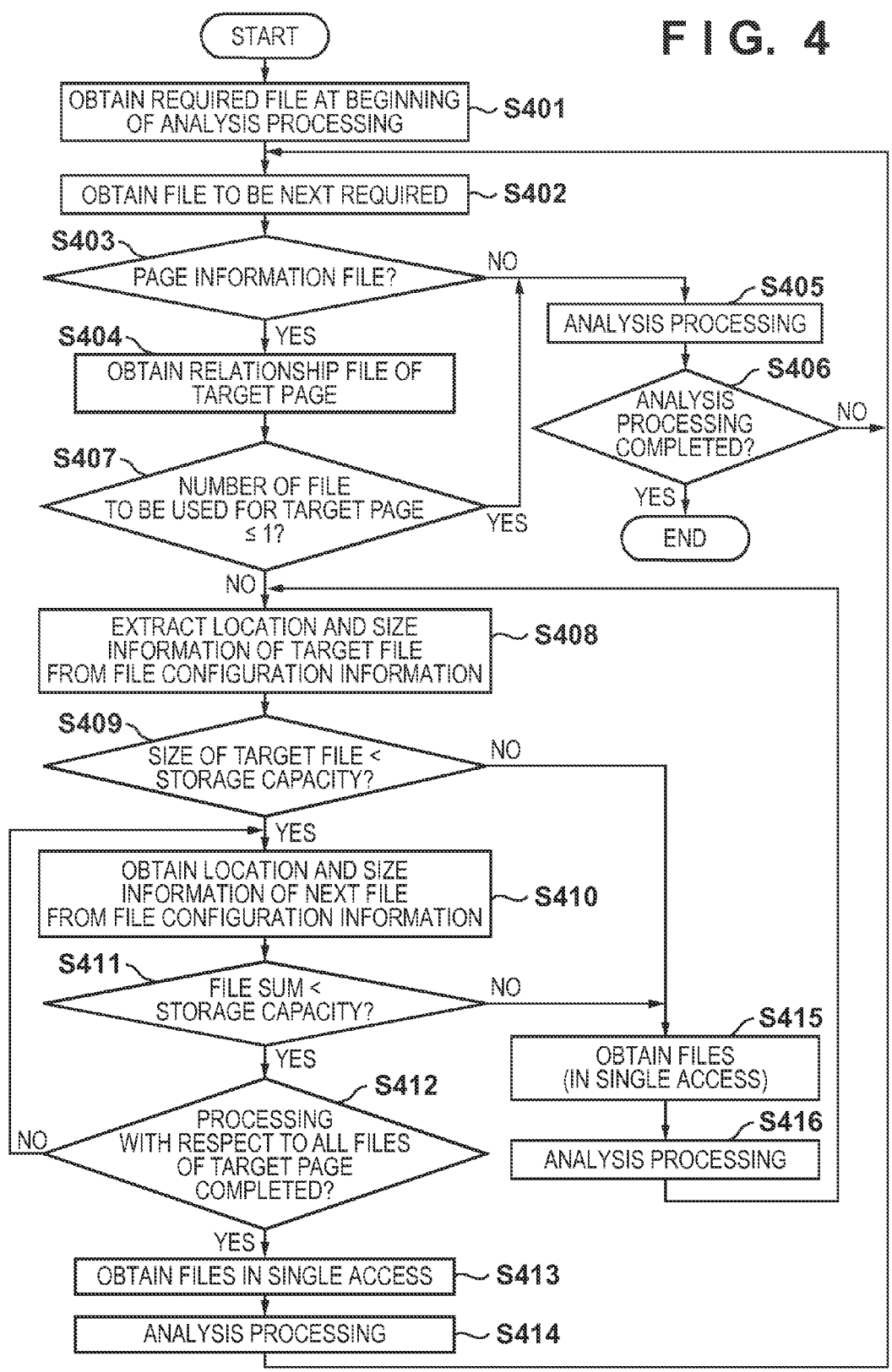

IMAGE PROCESSING APPARATUS, METHOD AND STORAGE MEDIUM FOR INCREASING THE SPEED OF PRINTING DATA STORED IN AN EXTERNAL STORAGE MEDIUM BY REDUCING THE NUMBER OF ACCESSES TO THE MEDIUM

BACKGROUND OF THE INVENTION

1. Field of the Invention

The present invention relates to an image processing apparatus, a method for controlling the same, and a storage medium.

2. Description of the Related Art

Recently, an image processing apparatus such as a printer that supports a plurality of types of Page Description Language (PDL) formats has been proposed. Such an image processing apparatus determines which type of PDL is used (that is, classifies the PDL) in print data to be printed (subjected to image formation) and appropriately interprets the print data according to the determination result, so as to perform print processing.

Also an image processing apparatus has been proposed to which an external medium (external storage medium) such as a USB (Universal Serial Bus) memory can be connected in which print data (PDL data) is stored, the image processing apparatus being capable of performing printing based on the print data stored in the external medium. Such a printing method is also referred to as "media direct printing" because printing is performed directly on the basis of print data stored in an external medium connected to an image processing apparatus, without a PC (Personal Computer) being interposed.

Japanese Patent Laid-Open No. 2008-183886 proposes an image formation apparatus capable of performing direct printing on the basis of print data stored in an external medium. According to the image formation apparatus of Japanese Patent Laid-Open No. 2008-183886, when such print processing is performed, bitmap data that is obtained by analyzing the print data stored in the external medium is associated with the print data and stored in the external medium when printing for the first time. And when printing a second and further times based on the same print data, the image formation apparatus reads out from the external medium the bitmap data associated with the print data to be printed, and performs print processing based on the bitmap data that was read out. This eliminates the need for performing analysis processing for generating bitmap data when performing printing of the same print data a second time and further times, thereby achieving an improvement in print speed.

In recent years, printing systems that support XPS (XML Paper Specification), which is advocated by Microsoft (Registered Trademark) as a novel PDL based on XML (Extensible Markup Language), have become known. Since XPS is not only a document file format but also usable as a PDL format, XPS document, which are data in the XPS format, constitute not only document data but also print data. Accordingly, in an apparatus that can perform direct printing based on print data stored in an external medium, as with the apparatus of Japanese Patent Laid-Open No. 2008-183886, it is conceivable to perform direct printing on the basis of an XPS document stored in the external medium.

An XPS document is generally generated by compressing a plurality of files that constitute the XPS document together into a zip format. If the XPS document stored in the external medium is subjected to print processing, it is necessary to read out (obtain) the files constituting the XPS document in the external medium in the order required for the analysis processing for printing, and to perform the analysis processing thereof. When reading out the files constituting the XPS document from the external medium, the files are read out one by one when required during the analysis processing, so that the external medium is accessed each time. The larger the number of the files constituting the XPS document is, the more often the external medium is accessed, resulting in an increase in an amount of time required for accessing to the external medium. Therefore, performing of printing, from the external medium, of print data that is compatible with a print format such as the XPS format, in which printing is performed using a plurality of files for each page, increases the number of accesses to the external medium, resulting in a reduction in print speed.

SUMMARY OF THE INVENTION

The present invention has been accomplished in view of the above-described problem. The present invention provides a technique for improving print speed by reducing the number of times an external storage medium is accessed, when performing, from the external storage medium, printing of print data that is compatible with a print format in which printing is performed using a plurality of files for each page.

According to one aspect of the present invention, there is provided an image processing apparatus comprising: a connector to which an external storage medium is connectable in which print data is stored, the print data being compatible with a print format in which printing is performed using a plurality of files for each page; a generation unit configured to generate configuration information that indicates a configuration of the print data that is compatible with the print format stored in external storage medium, and includes information indicating the sizes of a plurality of files included in the print data and the locations thereof within the print data; an obtainment unit configured to obtain a target file of the plurality of files included in the print data from the external storage medium in accordance with the configuration information, and to obtain, together with the target file, another file that is to be used for printing of the same page together with the target file, within the extent of a storage capacity of a storage unit of the image processing apparatus in a single access to the external storage medium, and to temporarily save the obtained files in the storage unit; and an analysis unit configured to perform analysis for printing of each page with respect to the files obtained from the external storage medium by the obtainment unit.

According to another aspect of the present invention, there is provided a method for controlling an image processing apparatus comprising a connector to which an external storage medium is connectable in which print data is stored, the print data being compatible with a print format in which printing is performed using a plurality of files for each page; the method comprising the steps of: generating configuration information that indicates a configuration of the print data that is compatible with the print format stored in external storage medium, and includes information indicating the sizes of a plurality of files included in the print data and the locations thereof within the print data; obtaining a target file of the plurality of files included in the print data from the external storage medium in accordance with the configuration information, and obtaining, together with the target file, another file that is to be used for printing of the same page together with the target file, within the extent of a storage capacity of a storage unit of the image processing apparatus in a single access to the external storage medium, and temporarily saving the obtained files in the storage unit; and performing analysis for printing of each page with respect to the files obtained from the external storage medium in the obtaining step.

According to still another aspect of the present invention, there is provided an image processing apparatus comprising: a connection unit configured to be used for connecting an external storage medium; a determination unit configured to determine each of sizes of a plurality of files included in one document stored in the external storage medium connected by the connection unit; an discrimination unit configured to discriminate files required for constituting a page subjected to analysis in the one document; a decision unit configured to decide files to be obtained in a single access to the external storage medium among the files, discriminated by the discrimination unit, required for constituting the page subjected to the analysis, based on the sizes determined by the determination unit; an obtainment unit configured to obtain the files decided by the decision unit from the external storage medium in a single access to the external storage medium; and an analysis unit configured to perform analysis to generate image data for printing based on the files obtained by the obtainment unit.

According to the present invention, when in the image processing apparatus printing of print data that is compatible with a print format, in which printing is performed using a plurality of files for each page, is performed from the external storage medium, it is possible to improve print speed by reducing the number of times the external storage medium is accessed.

Further features of the present invention will become apparent from the following description of exemplary embodiments (with reference to the attached drawings).

BRIEF DESCRIPTION OF THE DRAWINGS

FIG. 4 is a flowchart illustrating a procedure of analysis processing required for printing of print data in an external medium, the analysis processing being performed by the image processing apparatus 1 of the embodiment of the present invention.

DESCRIPTION OF THE EMBODIMENTS

Hereinafter, the embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Configuration of Image Processing Apparatus 1

Figure 1A:
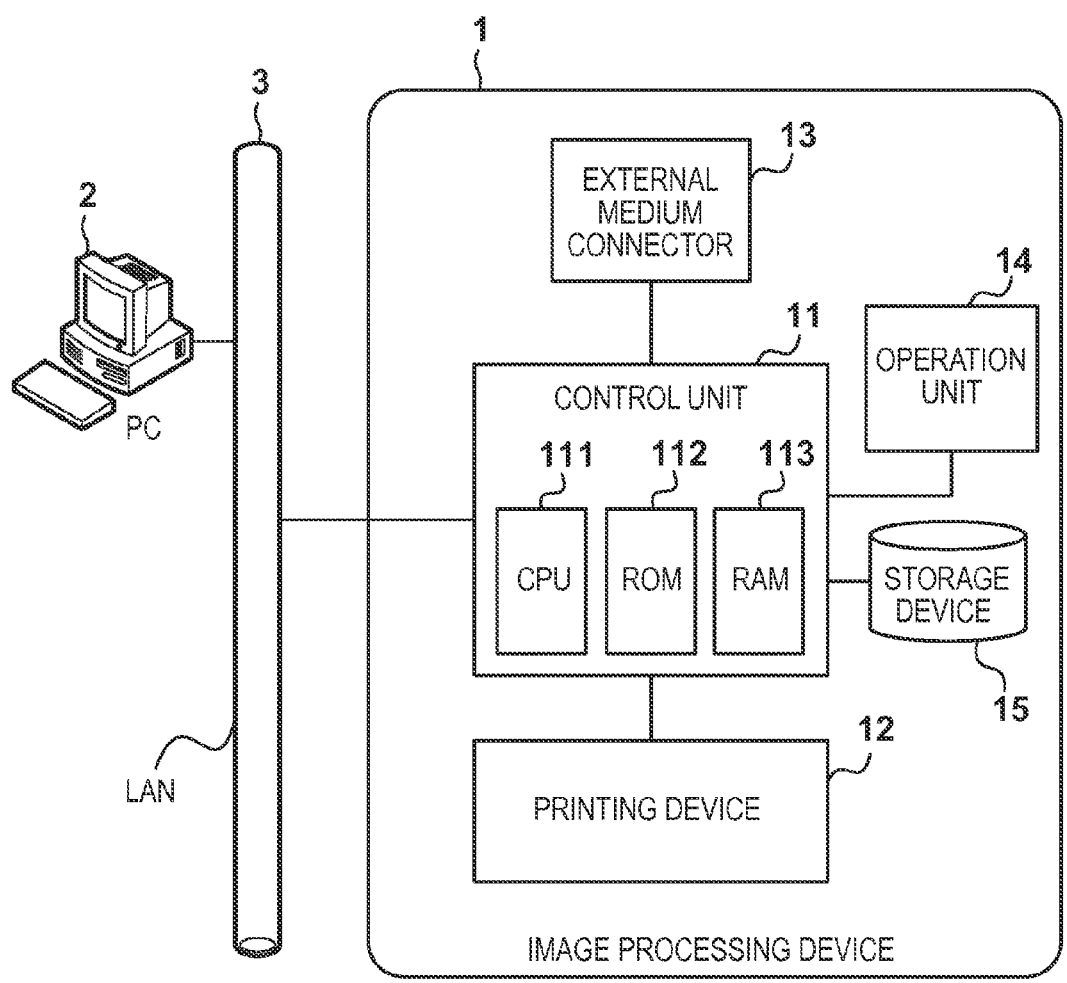
FIGS. 1A and 1B are block diagrams each schematically illustrating a configuration of a system including an image processing apparatus 1 according to an embodiment of the present invention.
Figure 1B:
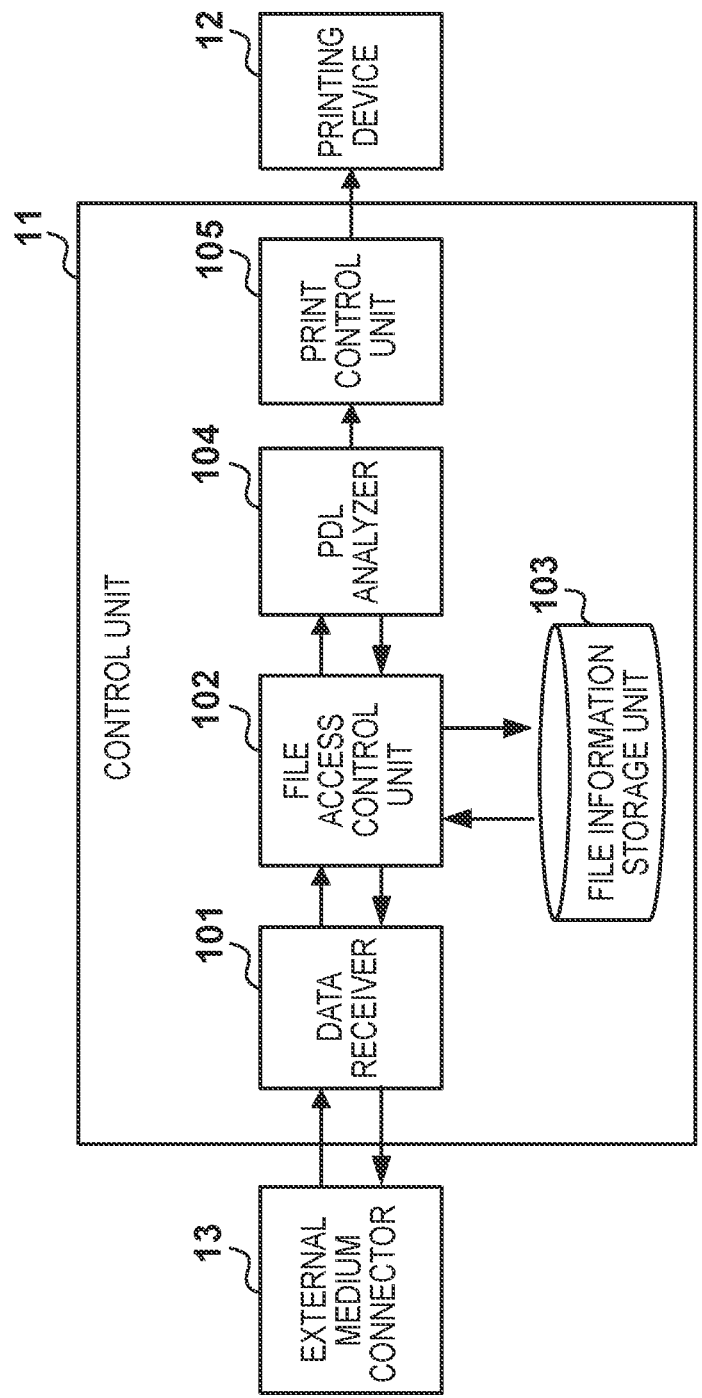

A configuration of an image processing apparatus 1 according to an embodiment of the present invention will first be described, with reference to FIGS. 1A and 1B, as an example of the image processing apparatus of the present invention. FIG. 1A illustrates a configuration of a system including the image processing apparatus 1 of the present embodiment, and FIG. 1B illustrates a configuration of a control unit 11 included in the image processing apparatus 1 of the present embodiment.

The image processing apparatus 1 illustrated in FIG. 1A is capable of print processing of print data in a PDL format such as XPS format, which is stored in an external storage medium connected to an external medium connector 13 (hereinafter referred to as an "external medium"). Note here that print data in XPS format is an example of print data that is compatible with the above-described print format in which printing is performed using a plurality of files for each page. The image processing apparatus 1 accesses, via the external medium connector 13, the external medium in which such print data is stored, and is capable of print processing of the print data directly from the external medium. The image processing apparatus 1 may be an MFP (Multi Function Printer), a SFP (Single Function Printer) or an LBP (Laser Beam Printer). Alternatively, the image processing apparatus 1 may be a printer of a print system other than an MFP, a SFP, and an LBP and may be, for example, an inkjet printer. The image processing apparatus 1 may be connected via an LAN (Local Area Network) 3 such as Ethernet (Registered Trademark) to a host computer (PC) 2 that gives various instructions to the image processing apparatus 1.

As illustrated in FIG. 1A, the image processing apparatus 1 includes the control unit 11, a printing device 12, the external medium connector 13, an operation unit 14, and a storage device 15. The control unit 11 controls the entire operation of the image processing apparatus 1. The control unit 11 receives print data (PDL data) from the external medium connector 13, the storage device 15, or an external device such as PC 2 via the LAN 3. The control unit 11 further controls the printing device 12 so that it performs processing for printing of the received print data.

The control unit 11 includes, as hardware resources, a CPU (Central Processing Unit) 111, a ROM (Read Only Memory) 112, and a RAM (Random Access Memory) 113. The CPU 111 controls the entire operation of the image processing apparatus 1 on the basis of a control program that is stored in the ROM 112 or another storage medium such as an HDD (not shown). This control program is an example of a computer program for realizing a method for controlling the image processing apparatus of the present invention. The RAM 113 is a storage medium for use as a work area of the CPU 111. The printing device 12 performs print processing of print data in accordance with an instruction of the control unit 11 (CPU 111). Specifically, the printing device 12 prints (outputs) an image that corresponds to the print data on a recording material, and discharges the recording material on which the image was printed.

The external medium connector 13 is a connector to which an external medium such as a USB memory can be connected, the external medium being removably connectable thereto. The print data stored in the external medium 13 can be input into the control unit 11 via this connector. The operation unit 14 functions as an input device for performing settings with respect to various functionalities. Further, the operation unit 14 includes a liquid crystal panel and functions as a display device that performs display regarding various functionalities and display indicating operation conditions or the like of the image processing apparatus 1. The control unit 11 can cause the storage device 15 to store (save) the print data.

As illustrated in FIG. 1B, the control unit 11 includes, as a plurality of functional units, a data receiver 101, a file access control unit 102, a PDL analyzer 104, and a print control unit 105. These functional units are realized on the image processing apparatus 1 by the CPU 111 of the control unit 11 reading out into the RAM 113 the control program stored in the ROM 112 or another storage medium, and executing it. A file information storage unit 103 corresponds to the RAM 113 as a hardware resource. Note that the file information storage unit 103 is arranged within the control unit 11 in FIG. 1B, but may be arranged outside the control unit 11. In this case, the file information storage unit 103 may correspond to the storage device 15 as a hardware resource.

The data receiver 101 receives via the external medium connector 13 the print data stored in the external medium connected to the external medium connector 13. Note that FIG. 1B illustrates a case where the data receiver 101 receives the print data from the external medium connector 13, but the data receiver 101 also may receive the print data from the storage device 15 or an external device via the LAN 3. In response to a request from the file access control unit 102, the data receiver 101 provides the file access control unit 102 with the print data received from the external medium connector 13.

The file access control unit 102 can control access to (the print data stored in) the external medium connected to the external medium connector 13. Specifically, in response to a request from the PDL analyzer 104, the file access control unit 102 obtains from the external medium, via the data receiver 101, files that are required for the analysis processing performed by the PDL analyzer 104, and provides the PDL analyzer 104 with the obtained files. For example, if print processing is to be performed for print data in the XPS format in the external medium, the file access control unit 102 obtains, of a plurality of files constituting the print data to be printed, those files that were requested by the PDL analyzer 104 and provides those files to the PDL analyzer 104.

If the print data in the external medium is in XPS format as a PDL format, then the file access control unit 102 further generates file configuration information about the print data in a manner that will be described later. Based on the generated file configuration information, the file access control unit 102 obtains files included in the print data within the external medium, as described above. And, the file access control unit 102 saves the generated information in the file information storage unit 103.

When obtaining the files included in the print data within the external medium, the file access control unit 102 can obtain, in accordance with the file configuration information, an obtainment target file together with one or more other files to be used for printing of the same page in a single access to the external medium. The file access control unit 102 temporarily saves these obtained files in the file information storage unit 103 until the PDL analyzer 104 requests them. Specifically, the file access control unit 102 obtains, in accordance with the file configuration information, these files within the extent of the storage capacity of the file information storage unit 103 from the external medium in a single access to it, and temporarily saves them in the file information storage unit 103, as will be described later. If a file that has already been saved in the file information storage unit 103 is requested by the PDL analyzer 104, then the file access control unit 102 may provide the PDL analyzer 104 with the file saved in the file information storage unit 103.

The PDL analyzer 104 analyzes the print data to be printed so as to print page by page. Specifically, by analyzing the print data depending on the PDL format of the print data, the PDL analyzer 104 generates raster image (bitmap) data for printing with the printing device 12 and provides the print control unit 105 with the generated data. If the print data is in an XPS format, the PDL analyzer 104 requests files from the file access control unit 102 in the order required for a page by page analysis, and analyzes the files in the order provided according to the request.

By transmitting the image data provided by the PDL analyzer 104 to the printing device 12, the print control unit 105 causes the printing device 12 to perform print processing using the image data. The printing device 12 outputs (prints) an image based on the received image data on the recording material. Note that, in the present embodiment, the file access control unit 102 is an embodiment for realizing a generation unit, an obtainment unit, and a determination unit. The file information storage unit 103 is an embodiment for realizing a storage unit. The PDL analyzer 104 is an embodiment for realizing an analysis unit.

Processing for Generating File Configuration Information

Figure 2:
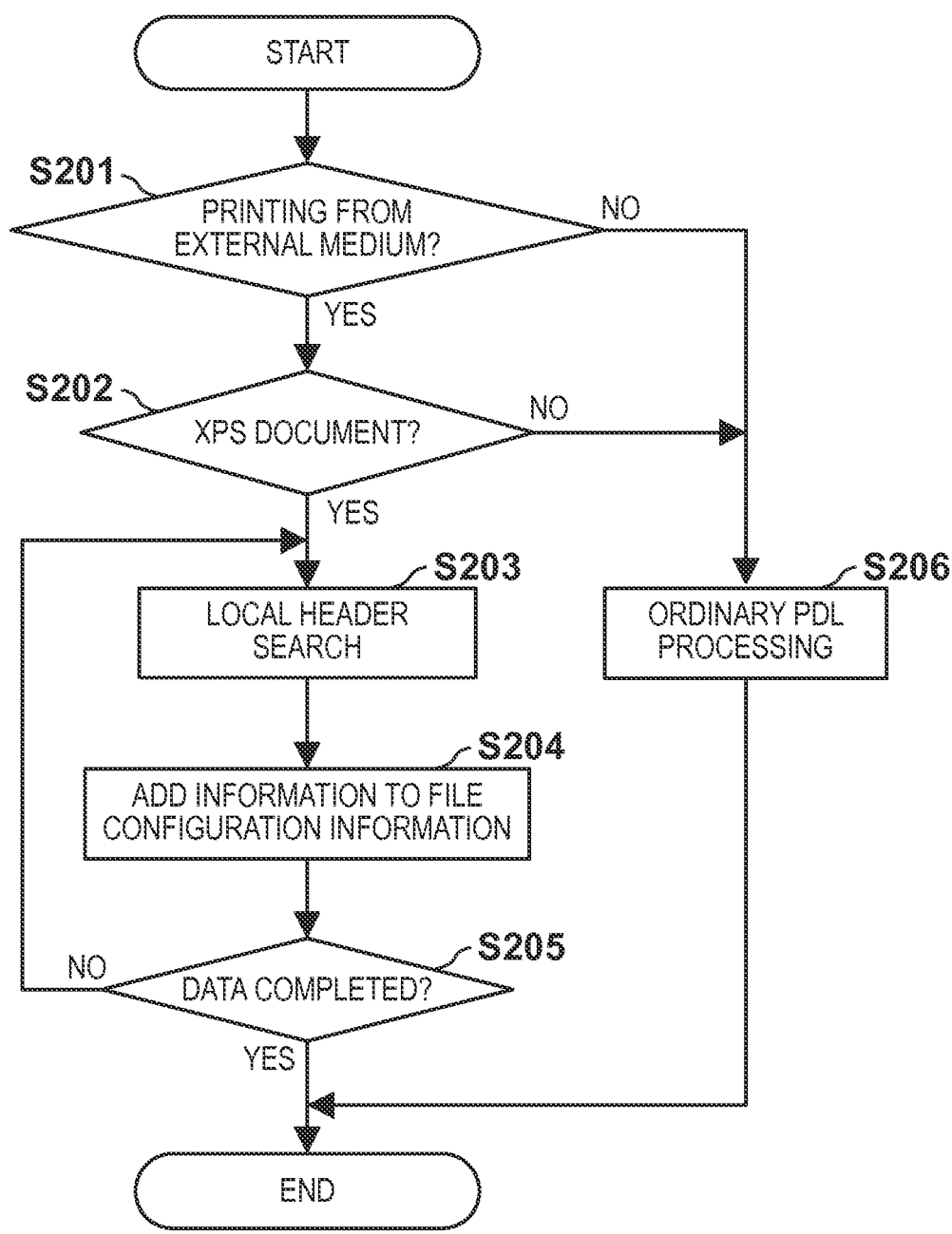
FIG. 2 is a flowchart illustrating processing procedure in which file configuration information is generated, the processing being performed by the image processing apparatus 1 of the embodiment of the present invention.

The following will describe, with reference to the flowchart of FIG. 2, processing for generating file configuration information about print data, which is performed by the image processing apparatus 1 of the present embodiment. The processes in steps of FIG. 2 are realized as processes performed by the functional units illustrated in FIG. 1B by the CPU 111 provided in the control unit 11 reading out into the RAM 113 a control program that is stored in the ROM 112 or another storage medium and executing it. The image processing apparatus 1 performs printing of the print data stored in the external medium, and generates file configuration information if the print data is in an XPS format, as will be described below.

When instructed to perform print processing of the print data, the file access control unit 102 starts to perform processing for the print data that is to be printed according to the instruction, in accordance with the flowchart illustrated in FIG. 2. First, in step S201, the file access control unit 102 obtains from the data receiver 101 information regarding a printing mode of the print data to be printed, and determines the printing mode. Specifically, the file access control unit 102 determines, on the basis of the information obtained from the data receiver 101, whether or not the printing mode is a printing mode in which print processing is performed based on the print data in the external medium connected to the external medium connector 13.

In step S201, if the file access control unit 102 determines that the printing mode is not the printing mode in which print processing is performed based on the print data in the external medium, the procedure advances to step S206. In step S206, the file access control unit 102 obtains from the data receiver 101 a file that was requested by the PDL analyzer 104 and provides the PDL analyzer 104 with the file, in order to let the PDL analyzer 104 perform ordinary PDL processing. Note that here the PDL processing corresponds to processing in which the PDL analyzer 104 identifies the PDL format of the print data to be printed, and analyzes the print data in accordance with the identified PDL format, so as to generate raster image data.

On the other hand, in step S201, if the file access control unit 102 determines that the printing mode is a printing mode in which print processing is performed based on the print data in the external medium, the procedure advances to step S202. In step S202, the file access control unit 102 further determines whether or not the print data to be printed, which is stored in the external medium, is an XPS document. If the file access control unit 102 determines that the print data to be printed is not an XPS document, then the procedure advances to step S206 so as to execute the above-mentioned processing, and otherwise, the procedure advances to step S203.

In steps S203 to S205, the file access control unit 102 generates the file configuration information regarding the print data (that is, the XPS document) in the external medium. The file configuration information indicates the configuration of the print data, and corresponds to information indicating the sizes of a plurality of files included in the print data and indicating the locations thereof in the print data.

Figures 3A, 3B:
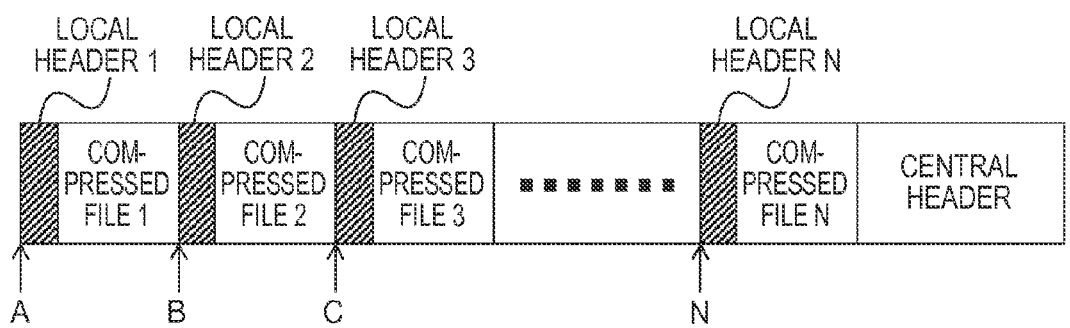
FIG. 3A is a diagram illustrating a configuration of print data (an XPS document) that is to be printed by the image processing apparatus 1 of the embodiment of the present invention.
FIG. 3B is a diagram illustrating file configuration information that corresponds to the print data illustrated in FIG. 3A.

The following will briefly describe, with reference to FIGS. 3A and 3B, a configuration of an XPS document that is to be printed (FIG. 3A), and file configuration information that corresponds to the XPS document (FIG. 3B). An XPS document is constituted by a plurality of files, such as an XML document (XML data) and image data. The XPS document is a document (print data) generated by compressing the plurality of files together into a ZIP format. As illustrated in FIG. 3A, therefore, the XPS document is configured by data units each constituted by a set of a file obtained by compressing the files constituting the XPS document, and a local header containing information about the compression. One local header is appended to the head portion of each of the files constituting the XPS document. The local header appended to each file includes information about the compression processing of the file and a file name, and the beginning of the local header contains the alphanumeric string "PK0304" as a signature.

In the present embodiment, in order to generate the information indicating the sizes of the plurality of files included in the XPS document, and the locations thereof in the XPS document, the local headers included in the XPS document are searched and the file configuration information is generated according to the search result. First, in step S203, the file access control unit 102 searches the XPS document in the external medium for the local headers indicating the head locations of the respective files constituting the XPS document. Specifically, the file access control unit 102 accesses the print data in the external medium via the data receiver 101, and searches for the alphanumeric string "PK0304" included in the XPS document, so as to identify the head locations of the files. The file access control unit 102 also extracts information included in the local headers that are present at the identified locations, the information indicating the file name of the file to which the local header is appended.

Next, in step S204, the file access control unit 102 regards the locations of the local headers obtained as the result of the local header search as the locations of the corresponding files, and generates file configuration information including the information indicating those locations. If file configuration information has already been generated, the information indicating the locations of the local headers is newly added to the file configuration information. The file access control unit 102 further calculates a difference in local header locations between adjacent files in the XPS document, and stores the obtained difference in the file configuration information as the size of each of the files constituting the XPS document. Note that the information indicating the file names obtained in step S203 is also stored in the file configuration information.

The file access control unit 102 generates, for example, the file configuration information illustrated in FIG. 3B from the XPS document illustrated in FIG. 3A. As illustrated in FIG. 3B, in the file configuration information, the location and the size are stored in correlation with each of the files 1 to N constituting the XPS document. And, the file access control unit 102 saves the generated file configuration information in the file information storage unit 103.

By repeating the above-mentioned processing with respect to each of the files constituting the XPS document (steps S203 to S205), the file access control unit 102 can generate and save the file configuration information regarding the XPS document. In step S205, the file access control unit 102 determines whether or not the local header search has been completed up to the end of the data that corresponds to the XPS document, and as long as it determines that the local header search has not been completed, the file access control unit 102 repeats the processing in steps S203 and S204, and otherwise, the file access control unit 102 ends the processing.

Analysis Processing with Respect to Print Data

The following will describe, with reference to the flowchart illustrated in FIG. 4, analysis processing required for printing of print data (a XPS document) in the external medium, performed by the image processing apparatus 1 according to the present embodiment. The processes in steps of FIG. 4 are realized as processes performed by the functional units illustrated in FIG. 1B by the CPU 111 provided in the control unit 11 reading out into the RAM 113 the control program stored in the ROM 112 or another storage medium and executing it.

Figure 5:
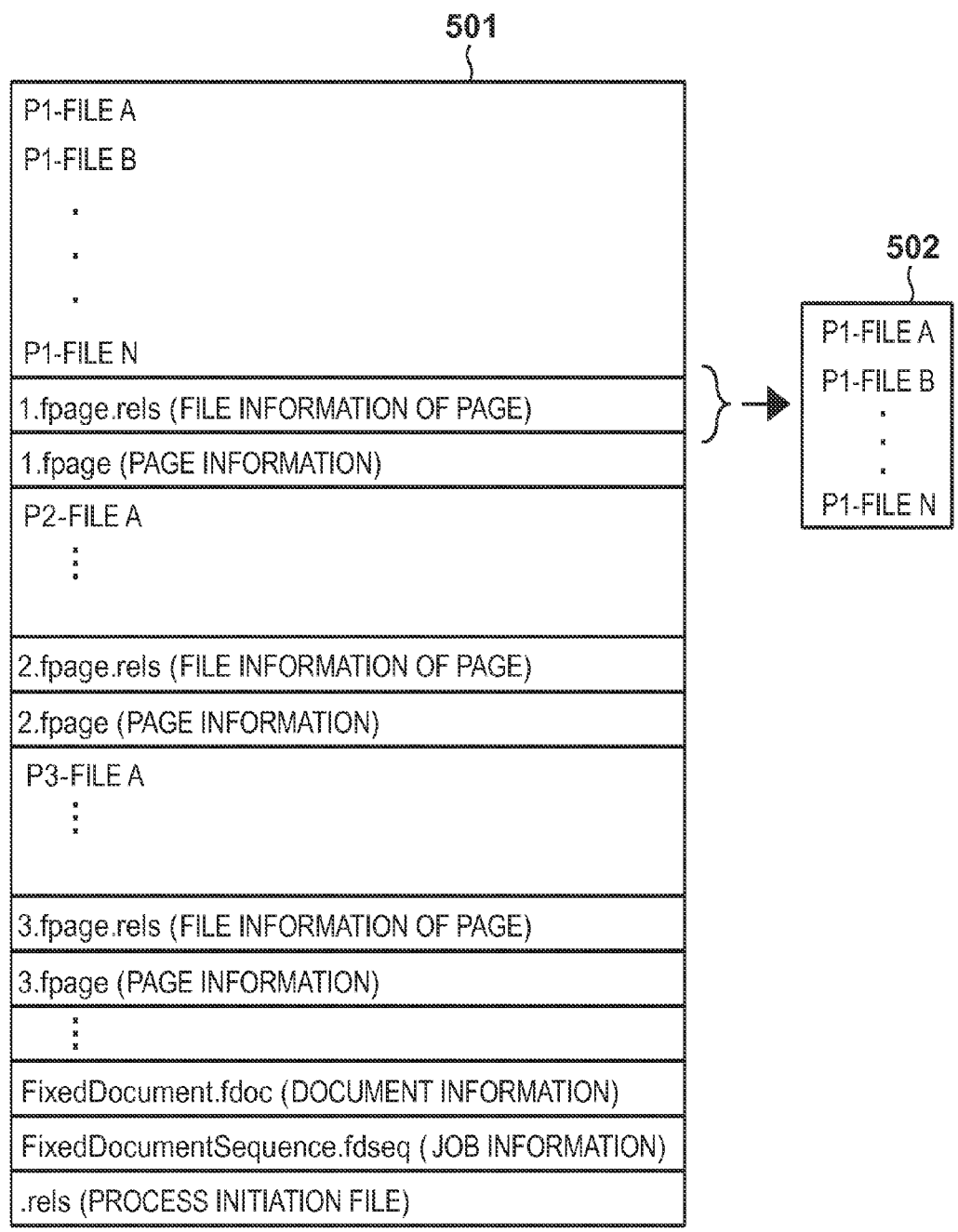
FIG. 5 is a diagram illustrating an example of a configuration of the XPS document according to the embodiment of the present invention.

FIG. 5 illustrates an example of a configuration of the XPS document that is to be printed by the image processing apparatus 1. Note, here, that FIG. 5 lists file names of the plurality of files constituting an XPS document 501. As illustrated in FIG. 5, the XPS document 501 includes: a relationship file (.rels) that corresponds to a process initiation file; a job information file (FixedDocumentSequence.fdseq); and a document information file (FixedDocument.fdoc). The XPS document 501 further includes, for each page, page information files (1.fpage to 3.fpage) each including information on the respective page, files to be used in the page (P1-file A to P1-file N and the like), relationship files (1.fpage.rels to 3.fpage.rels) in each of which a relationship among the files to be used in the respective pages is stated, and information about files to be required for printing of a target page according to the page information file is stated, for example.

Returning to FIG. 4, first in step S401, the file access control unit 102 obtains from the external medium via the data receiver 101 a file that is required for causing the PDL analyzer 104 to start the analysis processing for printing of the XPS document serving as print data. For example, the relationship file (.rels) shown in FIG. 5 corresponds to this required file. The file access control unit 102 provides the PDL analyzer 104 with the obtained file (.rels).

Next in step S402, the file access control unit 102 obtains from the external medium, in response to a request from the PDL analyzer 104, a file that is next required for the analysis processing in the PDL analyzer 104 after the file provided to the PDL analyzer 104 in step S401. Referencing the relationship file (.rels) provided in step S401, the PDL analyzer 104 requests from the file access control unit 102 files, in order, that are to be required for analysis of the XPS document. For example, the PDL analyzer 104 requests from the file access control unit 102 the job information file (FixedDocumentSequence.fdseq), the document information file (FixedDocument.fdoc), and the page information file (1.fpage) in this order.

In step S403, the file access control unit 102 determines whether or not the file obtained in step S402 is a page information file (e.g., 1.fpage). If the file access control unit 102 determines that the file is a page information file, then the procedure advances to step S404, and otherwise, the procedure advances to step S405.

In step S405, the PDL analyzer 104 performs processing for analyzing the syntax of the file obtained by the file access control unit 102 in step S402, and performs processing based on the analysis result. Further in step S406, the PDL analyzer 104 determines, as the result of the analysis in the S405, whether or not the analysis processing with respect to the entire XPS document has been completed, and if it is determined that the analysis processing has been completed, then the PDL analyzer 104 ends the analysis processing with respect to the XPS document, and otherwise, the processing returns to step S402.

On the other hand, in step S404, the file access control unit 102 obtains from the external medium the file (relationship file) in which the information about files to be required for printing of a target page is contained, the target page corresponding to the page information file obtained in step S403. For example, if a target page is the first page, the file access control unit 102 obtains from the external medium the relationship file 502 (1.fpage.rels) that corresponds to the page information file (1.fpage) of the first page included in the XPS document 501 to be printed. In the present embodiment, the relationship file 502 is an example of a specific file that includes information indicating files to be used for printing of the page subjected to analysis when the analysis of each page is started by the PDL analyzer 104.

The file access control unit 102 identifies, in accordance with the relationship file obtained in step S404, the files listed in the relationship file as the files to be used for printing of the target page. For example, the file access control unit 102 identifies the files listed in the relationship file 502 (P1-file A to P1-file N) as the files required for printing of the first page.

Next, in step S407, the file access control unit 102 determines whether or not the number of the files that are listed in the relationship file obtained in step S404 and used for printing of the target page is 1 or less (0 or 1). If it is determined that the number of the files is 1 or less, it is no longer necessary to obtain another file for the target page from the external medium, so that the file access control unit 102 proceeds with the processing in step S405. On the other hand, if it is determined that the number of the files is not 1 or less (i.e., 2 or more), then the procedure advances to step S408.

In step S408, the file access control unit 102 defines any file to be used for printing of the target page as an obtainment target file, and extracts, from the file configuration information, information that indicates the location and the size of the obtainment target file. Of the files listed in the relationship file of the target page, the file access control unit 102 identifies files that have not been yet obtained, in order, as obtainment target files. For example, the file access control unit 102 first extracts, from the file configuration information in the file information storage unit 103, information indicating the location of the file "P1-file A" within the XPS document 501 and the size thereof, the file "P1-file A" being listed in the relationship file. Further in step S409, the file access control unit 102 determines whether or not the size of the obtainment target file indicated by the information extracted in step S408 is smaller than the storage capacity of the file information storage unit 103. If the file access control unit 102 determines that the size of the obtainment target file is smaller than the storage capacity of the file information storage unit 103, then the procedure advances to step S410, and otherwise, the procedure advances to step S415.

In step S415, the file access control unit 102 obtains the obtainment target file from the location, within the XPS document 501 stored in the external medium, that is indicated by the information extracted in step S408. In this case, the file access control unit 102 provides the PDL analyzer 104 with the obtained file, without temporarily saving it in the file information storage unit 103. Upon this, the PDL analyzer 104 performs, in step S416, the PDL analysis processing with respect to the file provided by the file access control unit 102, and returns the procedure to step S408.

On the other hand, in step S410, the file access control unit 102 extracts, from the file configuration information in the file information storage unit 103, information that indicates the location and the size of a file that is to be next obtained after the obtainment target file, the location being located within the XPS document 501. Specifically, of the files listed in the relationship file, the file access control unit 102 extracts, from the file configuration information, information that indicates the location and the size of a file that is to be next obtained after the obtainment target file. For example, in the first page, information that indicates the location and the size of "P1-file B" is extracted from the file configuration information after "P1-file A".

Subsequently, in step S411, the file access control unit 102 calculates the sum of the sizes of the files extracted from the file configuration information in steps S408 and S410, and determines whether or not the sum is less than the storage capacity of the file information storage unit 103. Namely, it is determined here whether or not it is possible to obtain the obtainment target file and one or more other files to be used for printing of the same page together with the obtainment target file all together from the external medium in a single access to it, and to temporarily save them in the file information storage unit 103. If the file access control unit 102 determines that the calculated sum is less than the storage capacity of the file information storage unit 103, the procedure advances to step S412, and otherwise, the procedure advances to step S415. Note here that the storage capacity of the file information storage unit 103 does not necessarily refer to the total storage capacity of the file information storage unit 103. That is, of the total storage capacity, storage capacity assigned to file storage may refer to capacity available in the determination in step S409 (or S411), and it is also possible that the value of the storage capacity can be changed as suitable by a user or an administrator.

In step S412, the file access control unit 102 determines, with respect to all files listed in the relationship files of the target file, whether or not the processing in steps S408 to S411 has been completed. If the file access control unit 102 determines that the processing with respect to the all files of the target page has been completed, then the procedure advances to step S413, and otherwise, the procedure returns to step S410.

In step S410, the file access control unit 102 extracts, from the file configuration information, information that indicates the location and the size of a file that is to be next obtained from the XPS document 501 in the external medium after the file that was previously subjected to extraction of the location and size information. For example, if the previous file is "P1-file B", the information indicating the location and the size of "P1-file C" is then extracted from the file configuration information. Further in step S411, the file access control unit 102 updates the previously calculated sum by adding the file size extracted in step S410 thereto, and compares the updated sum with the storage capacity of the file information storage unit 103. Accordingly, it is determined whether or not it is possible to obtain the files that are subjected to the calculation of the updated sum all together from the external medium in a single access to it, and to temporarily save them in the file information storage unit 103.

Thus, the file access control unit 102 decides one or more files to be obtained together with the obtainment target file, which was defined in the step S408, to an extent that the sum calculated in step S411 does not exceed the storage capacity of the file information storage unit 103. If the processing with respect to all files of the target page has been completed and the procedure advanced to step S413, the file access control unit 102 obtains, from the external medium in a single access to it, the plurality of files that were decided as files to be obtained together, and temporarily saves them in the file information storage unit 103. In this regard, the file access control unit 102 obtains the files from the locations in the XPS document 501 that are indicated by the information extracted from the file configuration information. After that, the file access control unit 102 provides the PDL analyzer 104 with the files requested by the PDL analyzer 104 in the order required for analysis of the target page. The PDL analyzer 104 performs, in step S414, the analysis for printing with respect to the files provided by the file access control unit 102 in order. When the PDL analyzer 104 has completed the analysis processing with respect to all the files to be used for printing of the target page, the procedure returns to step S402.

If the procedure advances from step S409 to step S415, the file access control unit 102 obtains in step S415 the files to be obtained from the external medium, and provides them to the PDL analyzer 104. In this case, the file access control unit 102 obtains the files from the locations in the XPS document 501 that are indicated by the information extracted from the file configuration information.

On the other hand, if the procedure advances from step S411 to step S415, the file access control unit 102 performs the following processing. Namely, in step S415, the file access control unit 102 obtains, from the external medium, the one or more files that were decided as files to be obtained together with the obtainment target file, within the extent of the storage capacity of the file information storage unit 103. In this case, the file access control unit 102 obtains the files from the locations in the XPS document 501 that are indicated by the information extracted from the file configuration information. Further, the file access control unit 102 temporarily saves the obtained files in the file information storage unit 103. In response to a request from the PDL analyzer 104, the file access control unit 102 provides the PDL analyzer 104 with the corresponding files temporarily saved in the file information storage unit 103.

In step S416, as in step S414, the PDL analyzer 104 performs the analysis for printing with respect to the files provided in order by the file access control unit 102. When the PDL analyzer 104 has completed the analysis processing with respect to all the files temporarily saved in the file information storage unit 103, the procedure returns to step S408.

As has been described above, the image processing apparatus of the present embodiment obtains, from the external medium, print data in an XPS format or the like that is compatible with a print format in which printing is performed using a plurality of files for each page, and performs analysis for printing for each page. Specifically, the image processing apparatus generates configuration information that includes information indicating the sizes of the files included in the print data stored in the external medium, and indicating the locations thereof within the print data. Further, when obtaining each file in the print data, the image processing apparatus obtains an obtainment target file and one or more other files to be used for printing of the same page all together, within the extent of the storage capacity of a storage unit of the image processing apparatus, from the external medium in a single access to it in accordance with the configuration information. The image processing apparatus temporarily saves the files that were obtained together in the storage unit, and analyzes the files in order.

Accordingly, by obtaining from the external medium an obtainment target file and one or more other files to be used for printing of the same page all together, within the extent of the storage capacity of the storage unit, it is possible to efficiently obtain a plurality of files with a single access. That is, since files are not obtained in separate accesses when the files are obtained from an external medium in which print data in an XPS format or the like is stored, it is possible to reduce the number of times the external medium is accessed. As the result, it is possible to improve the speed of printing of the print data.

Further, when the print data is an XPS document, there may be cases where a plurality of files constituting the XPS document are stored in continuous locations (a unified location) in the XPS document, and cases where they are stored in scattered locations. If a plurality of files included in the print data are stored in continuous locations, then it is possible, when obtaining the plurality of files together, to obtain the files from the external medium more efficiently.

In this regard, in the above-described embodiment, the file access control unit 102 may further determine, for each page, continuity of the locations of the files to be obtained from the external medium and files to be used together with those files for printing of the same page. That is, it is also possible to determine whether or not these files are stored in continuous locations in the print data. Only if the determination result shows that these files are stored in continuous locations, the file access control unit 102 may obtain, from the external medium, these files together within the extent of the storage capacity of the file information storage unit 103, and temporarily save them therein. On the other hand, if it is determined that these files are stored in scattered locations in the print data, then multiple accesses to the external medium will eventually be required when obtaining these files together. In this case, therefore, there is no need to obtain these files together from the external medium.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-042383, filed Feb. 28, 2012, which is hereby incorporated by reference herein in its entirety.

What is claimed is:

1. An image processing apparatus comprising:
a connector to which an external storage medium is connectable in which print data is stored, the print data being compatible with a print format in which printing is performed using a plurality of files for each page;
a generation unit configured to generate configuration information that indicates a configuration of the print data that is compatible with the print format stored in the external storage medium, and includes information indicating the sizes of a plurality of files included in the print data and the locations thereof within the print data;
an obtainment unit configured to obtain a target file of the plurality of files included in the print data from the external storage medium in accordance with the configuration information, and to obtain, together with the target file, another file that is to be used for printing of the same page together with the target file, within the extent of a storage capacity of a storage unit of the image processing apparatus in a single access to the external storage medium, and to temporarily save the obtained files in the storage unit; and
an analysis unit configured to perform analysis for printing of each page with respect to the files obtained from the external storage medium by the obtainment unit.

2. The image processing apparatus according to claim 1, wherein the obtainment unit comprises:
a unit configured to calculate the sum of the sizes of the target file to be obtained and the another file to be used for printing of the same page together with the target file, using the information that is included in the configuration information and indicates the sizes;
a unit configured to decide one or more files to be obtained together with the target file, to an extent that the calculated sum does not exceed the storage capacity of the storage unit; and
a unit configured to obtain the target file and the decided one or more files all together in a single access to the external medium, and to temporarily save the obtained files in the storage unit.

3. The image processing apparatus according to claim 1, wherein the obtainment unit is configured, when the analysis of each page is started by the analysis unit, to obtain from the external storage medium a specific file that includes information indicating files to be used for printing of the page subjected to the analysis, and to identify files listed in the obtained specific file as the files to be used for printing of the page.

4. The image processing apparatus according to claim 1, further comprising:
a determination unit configured to determine, on the basis of the configuration information, whether or not the target file to be obtained by the obtainment unit and the another file to be used for printing of the same page together with the target file are stored in continuous locations in the print data,
the obtainment unit being configured, only when the determination unit has determined that the target file and the another file are stored in continuous locations in the print data, to obtain the target file and the another file all together from the external storage medium in a single access to the external storage medium, within the extent of the storage capacity of the storage unit, and to temporarily save the target file and the another file in the storage unit.

5. The image processing apparatus according to claim 1, wherein the generation unit is configured to generate the configuration information by searching headers that indicate head locations of the plurality of files included in the print data stored in the external storage medium, and taking the locations of the headers as locations of the respective files and differences in the header locations between adjacent files as sizes of the respective files.

6. The image processing apparatus according to claim 1, wherein the print data compatible with the print format is print data in an XPS format.

7. A method for controlling an image processing apparatus comprising a connector to which an external storage medium is connectable in which print data is stored, the print data being compatible with a print format in which printing is performed using a plurality of files for each page; the method comprising the steps of:
generating configuration information that indicates a configuration of the print data that is compatible with the print format stored in the external storage medium, and includes information indicating the sizes of a plurality of files included in the print data and the locations thereof within the print data;
obtaining a target file of the plurality of files included in the print data from the external storage medium in accordance with the configuration information, and obtaining, together with the target file, another file that is to be used for printing of the same page together with the target file, within the extent of a storage capacity of a storage unit of the image processing apparatus in a single access to the external storage medium, and temporarily saving the obtained files in the storage unit; and
performing analysis for printing of each page with respect to the files obtained from the external storage medium in the obtaining step.

8. A non-transitory computer-readable storage medium storing a computer program for causing a computer to execute the steps of the method for controlling the image processing apparatus according to claim 7.

9. An image processing apparatus comprising:
a connection unit configured to be used for connecting an external storage medium;
a determination unit configured to determine each of the sizes of a plurality of files included in one document stored in the external storage medium connected by the connection unit;
a discrimination unit configured to discriminate files required for constituting a page subjected to analysis in the one document;
a decision unit configured to decide files to be obtained in a single access to the external storage medium among the files, discriminated by the discrimination unit, required for constituting the page subjected to the analysis, based on the sizes determined by the determination unit;
an obtainment unit configured to obtain the files decided by the decision unit from the external storage medium in a single access to the external storage medium; and
an analysis unit configured to perform analysis to generate image data for printing based on the files obtained by the obtainment unit.

10. The image processing apparatus according to claim 9, further comprising:
an identification unit configured to identify respective locations, of a plurality of files included in one document stored in the external storage medium, within the one document, wherein the obtainment unit is configured to obtain, from the external storage medium, the files decided by the decision unit based on the locations identified by the identification unit.

11. The image processing apparatus according to claim 9, further comprising:

a storage unit configured to store files to be analyzed by the analysis unit, wherein the decision unit is configured to decide files to be obtained in a single access to the external storage medium among the files, discriminated by the discrimination unit, required for constituting the page subjected to the analysis, based on the sizes determined by the determination unit and a storage capacity of the storage unit.

12. The image processing apparatus according to claim 9, wherein the discrimination unit is configured to discriminate the files required for constituting the file subjected to the analysis by analyzing a specific file which is included in the one document and which states information about the page subjected to the analysis.

13. The image processing apparatus according to claim 9, wherein the plurality of files included in the one document are compressed files.

14. The image processing apparatus according to claim 9, wherein the one document is XPS format data.

15. A method for controlling an image processing apparatus having a connection unit for connecting an external storage medium, the method comprising the steps of:

determining each of the sizes of a plurality of files included in one document stored in the external storage medium connected by the connection unit;

discriminating files required for constituting a page subjected to analysis in the one document;

deciding files to be obtained in a single access to the external storage medium among the discriminated files required for constituting the page subjected to the analysis, based on the determined sizes;

obtaining the decided files from the external storage medium in a single access to the external storage medium; and performing analysis to generate image data for printing based on the obtained files.

16. A non-transitory computer-readable storage medium storing a computer program for causing a computer to execute the steps of the method for controlling the image processing apparatus according to claim 15.

* * * * *